United States Patent
Komikawa et al.

(10) Patent No.: US 11,873,002 B2
(45) Date of Patent: Jan. 16, 2024

(54) ASSISTANCE DEVICE FOR SUPPORTING SWITCHING BETWEEN AUTOMATIC DRIVING MODE AND MANUAL DRIVING MODE

(71) Applicant: PANASONIC INTELLECTUAL PROPERTY MANAGEMENT CO., LTD., Osaka (JP)

(72) Inventors: Kiyoshi Komikawa, Kanagawa (JP);
Hiroyuki Tominaga, Kanagawa (JP);
Kazuhiro Yamane, Kanagawa (JP);
Kousuke Mitsunaga, Kanagawa (JP);
Satoshi Tanaka, Kanagawa (JP);
Naomi Ushioda, Kanagawa (JP);
Toshiaki Ikematsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/704,409

(22) Filed: Mar. 25, 2022

(65) Prior Publication Data
US 2022/0306145 A1 Sep. 29, 2022

(30) Foreign Application Priority Data
Mar. 26, 2021 (JP) ................................. 2021-052946

(51) Int. Cl.
*B60W 50/14* (2020.01)
*B60W 30/182* (2020.01)
(Continued)

(52) U.S. Cl.
CPC ............. *B60W 50/14* (2013.01); *B60K 35/00* (2013.01); *B60W 30/182* (2013.01);
(Continued)

(58) Field of Classification Search
CPC ............... B60W 50/14; B60W 30/182; B60W 2050/143; B60W 2050/146; B60K 35/00;
(Continued)

(56) References Cited

U.S. PATENT DOCUMENTS

| 10,732,627 B1 * | 8/2020 | Roberson | G08G 1/162 |
| 2012/0123613 A1 * | 5/2012 | Waki | G08G 1/166 701/1 |

(Continued)

FOREIGN PATENT DOCUMENTS

| EP | 3381758 A1 * | 10/2018 | ............ B60W 50/14 |
| JP | 2015-141560 | 8/2015 | |

(Continued)

*Primary Examiner* — Chico A Foxx
(74) *Attorney, Agent, or Firm* — Greenblum & Bernstein, P.L.C.

(57) ABSTRACT

A vehicle can execute an automatic driving mode and a manual driving mode as a driving mode. An assistance device supports mode switching from the automatic driving mode to the manual driving mode. The assistance device includes an acquisition interface and a notification interface. The acquisition interface acquires data indicating a situation around the vehicle. The notification interface that communicates a candidate position derived based on the data acquired by the acquisition interface, the candidate position being a candidate of a position where the mode switching should be executed.

12 Claims, 19 Drawing Sheets

(51) Int. Cl.
  *B60K 35/00* (2006.01)
  *G01C 21/36* (2006.01)
(52) U.S. Cl.
  CPC ....... *G01C 21/367* (2013.01); *G01C 21/3658* (2013.01); *B60K 2370/166* (2019.05); *B60K 2370/172* (2019.05); *B60K 2370/193* (2019.05); *B60W 2050/143* (2013.01); *B60W 2050/146* (2013.01)
(58) Field of Classification Search
  CPC ........ B60K 2370/166; B60K 2370/193; B60K 2370/172; G01C 21/3658; G01C 21/367
  See application file for complete search history.

(56) References Cited

U.S. PATENT DOCUMENTS

| | | | | |
|---|---|---|---|---|
| 2014/0156134 | A1* | 6/2014 | Cullinane | B60R 22/48 701/23 |
| 2014/0309833 | A1* | 10/2014 | Ferguson | G05D 1/00 701/23 |
| 2016/0121907 | A1* | 5/2016 | Otake | B60W 10/20 701/23 |
| 2017/0259814 | A1* | 9/2017 | Fujimura | G06V 20/58 |
| 2017/0303842 | A1* | 10/2017 | Yoshida | B60W 50/14 |
| 2017/0368936 | A1* | 12/2017 | Kojima | B60W 40/09 |
| 2018/0056900 | A1* | 3/2018 | Lee | G06N 5/04 |
| 2018/0194280 | A1* | 7/2018 | Shibata | G01C 21/3484 |
| 2018/0201275 | A1* | 7/2018 | Tsuji | B60W 30/18 |
| 2019/0025825 | A1* | 1/2019 | Takahama | B60W 50/14 |
| 2019/0212731 | A1* | 7/2019 | Flynn | B60W 40/09 |
| 2019/0217863 | A1* | 7/2019 | Jung | B60W 30/0956 |
| 2019/0232976 | A1 | 8/2019 | Uetani et al. | |
| 2019/0241198 | A1* | 8/2019 | Mori | G08G 1/16 |
| 2019/0243360 | A1* | 8/2019 | Uetani | B60Q 9/00 |
| 2020/0231181 | A1* | 7/2020 | Miyahara | B62D 15/025 |
| 2020/0307641 | A1* | 10/2020 | Oyama | B60W 40/08 |
| 2020/0369151 | A1* | 11/2020 | Nakajima | G02B 27/0101 |
| 2021/0229708 | A1* | 7/2021 | Kondo | B60W 60/001 |
| 2021/0370983 | A1* | 12/2021 | Oba | B60W 50/16 |
| 2022/0184506 | A1* | 6/2022 | Liu | A63F 13/92 |
| 2023/0191911 | A1* | 6/2023 | Izumi | B60W 50/14 701/36 |

FOREIGN PATENT DOCUMENTS

| | | | | |
|---|---|---|---|---|
| JP | 2018-146552 | | 9/2018 | |
| JP | 2018149874 | A * | 9/2018 | ............. B60K 35/00 |

\* cited by examiner

FIG. 17A

| EXAMPLE OF DATA | DATA SOURCE | USAGE (DETAIL OF CANDIDATE POSITION) |
|---|---|---|
| CURVATURE OF ROAD | MAP DATA | ROAD WITH SMALL CURVATURE |
| PRESENCE OR ABSENCE OF OBSTACLE ON ROAD, DISTANCE THERETO | PUBLIC TRANSPORTATION INFORMATION | ROAD WITH NO OBSTACLES |
| LOCATION OF ACCIDENT SPOT | PUBLIC TRANSPORTATION INFORMATION | ROAD THAT IS NOT ACCIDENT SPOT |
| TRAFFIC JAM SITUATION IN DIRECTION OF TRAVEL | PUBLIC TRANSPORTATION INFORMATION | ROAD WITH NO TRAFFIC JAM |

FIG. 17B

| EXAMPLE OF DATA | DATA SOURCE | USAGE (DETAIL OF CANDIDATE POSITION) | IMPROVEMENTS |
|---|---|---|---|
| NUMBER OF LANES ON ROAD | MAP DATA | ROAD WITH LARGE NUMBER OF LANES ROAD IN SECTION WITH NO INCREASE OR DECREASE IN NUMBER OF LANES | EXPANSION OF INDICATORS FOR SAFETY OF MANUAL SWITCHING |
| LANE INFORMATION ON ROAD | MAP DATA | ROAD WITH THROUGH LANE | ↑ |
| GRADIENT OF ROAD | MAP DATA | ROAD WITH MILD GRADIENT | ↑ |
| SPEED LIMIT | MAP DATA | ROAD IN SECTION WITH NO INCREASE OR DECREASE IN SPEED LIMIT | ↑ |
| ROAD ATTRIBUTE | MAP DATA | MAIN ROAD ONLY (IC, JCT SECTIONS ARE NOT COVERED) | ↑ |
| VICS ROAD | MAP DATA | VICS ROADS ONLY | |
| ROAD RANK | MAP DATA | (IN ADDITION TO EXPRESSWAYS) ORDINARY NATIONAL HIGHWAY/CARS ONLY ROAD | EXPANSION OF MANUAL SWITCHING SPOTS |
| REST FACILITIES LOCATED IN DIRECTION OF TRAVEL | MAP DATA | REST FACILITIES (CLOSEST, IMMEDIATELY BEFORE IC EXIT, ETC.) | ↑ |

FIG. 18

| USAGE (DETAIL OF CANDIDATE POSITION) | PROCESSING LOGIC |
|---|---|
| ROAD WITH SMALL INCREASE OR DECREASE IN NUMBER OF LANES | ACQUIRE NUMBER OF LANES/GRADIENT/SPEED LIMIT AT MULTIPLE SPOTS IN SECTION OF SWITCHING AND REMOVE POSITION FROM RECOMMENDED SWITCHING POSITIONS WHEN DIFFERENCE IS EQUAL TO GREATER THAN PREDETERMINED VALUE |
| ROAD WITH MILD GRADIENT | |
| ROAD WITH SMALL INCREASE OR DECREASE IN SPEED LIMIT | |
| MAIN ROAD ONLY (IC, JCT SECTIONS ARE NOT COVERED) | REMOVE POSITION FROM RECOMMENDED SWITCHING POSITIONS WHEN ROAD IN SECTION OF SWITCHING REPRESENTS IC, JCT |
| ROAD THAT IS NOT JUNCTION OR MEETING POINT | REMOVE POSITION FROM RECOMMENDED SWITCHING POSITIONS WHEN MEETING POINT OR JUNCTION POINT IS LOCATED IN SECTION OF SWITCHING |
| VICS ROADS ONLY | REMOVE POSITION FROM RECOMMENDED SWITCHING POSITIONS WHEN NON-VICS ROAD IS LOCATED IN SECTION OF SWITCHING |
| ROAD WITH NO TUNNELS | REMOVE POSITION FROM RECOMMENDED SWITCHING POSITIONS WHEN THERE IS TUNNEL IN SECTION OF SWITCHING |
| (IN ADDITION TO EXPRESSWAYS) ORDINARY NATIONAL HIGHWAY/CARS ONLY ROAD | CARS ONLY ROAD OTHER THAN EXPRESSWAYS ARE SUBJECT TO RECOMMENDATION OF POSITION FOR SWITCHING |
| ROAD/PARKING AREA IN REST FACILITIES (CLOSEST, IMMEDIATELY BEFORE IC EXIT, ETC.) | REST FACILITIES SUCH AS SA, PA ARE SUBJECT TO RECOMMENDATION OF POSITION FOR SWITCHING |

ASSISTANCE DEVICE FOR SUPPORTING SWITCHING BETWEEN AUTOMATIC DRIVING MODE AND MANUAL DRIVING MODE

CROSS-REFERENCE TO RELATED APPLICATION

This application is based upon and claims the benefit of priority from the prior Japanese Patent Application No. 2021-052946, filed on Mar. 26, 2021, the entire contents of which are incorporated herein by reference.

BACKGROUND

1. Field

The present disclosure relates to assistance devices and, more particularly, to an assistance device for supporting switching between an automatic driving mode and a manual driving mode.

2. Description of the Related Art

In the automatic driving mode of a vehicle, the computer takes control to drive the vehicle, and, in the manual driving mode of a vehicle, the driver manipulates the vehicle. While the automatic driving mode is desired to reduce the load on the driver, the driver may have to drive the vehicle depending on the situation. A technology for switching between the automatic driving mode and the manual driving mode safely is called for. When there is an event ahead on the route that could trigger suspension of automatic driving, the timing of suspension of automatic driving is reconfigured according to a request of the driver (see, for example, patent literature 1).

[Patent literature 1] JP 2015-141560
[Patent literature 2] JP 2018-146552

When the driving mode of a vehicle is switched from the automatic driving mode to the manual driving mode, it is requested to let the driver know the position at which the driving mode is switched in a manner easy to understand.

SUMMARY

The present disclosure addresses the above-described issue, and a general purpose thereof is to provide a technology of letting the driver know the position at which the driving mode should be switched in a manner easy to understand.

An assistance device according to an embodiment of the present disclosure is an assistance device that supports, in a vehicle capable of executing an automatic driving mode and a manual driving mode as a driving mode, mode switching from the automatic driving mode to the manual driving mode, including: an acquisition interface that acquires data indicating a situation around the vehicle; and a notification interface that communicates a candidate position derived based on the data acquired by the acquisition interface, the candidate position being a candidate of a position where the mode switching should be executed. The notification interface communicates at least one of a distance to the candidate position, a period of time elapsed until the candidate position is reached, and a point of time when the candidate position is reached.

Another embodiment of the present disclosure also relates to an assistance device. The device is an assistance device that supports, in a vehicle capable of executing an automatic driving mode and a manual driving mode as a driving mode, mode switching from the automatic driving mode to the manual driving mode, including: an acquisition interface that acquires data indicating a situation around the vehicle; and a notification interface that communicates a candidate position derived based on the data acquired by the acquisition interface, the candidate position being a candidate of a position where the mode switching should be executed. The notification interface displays a graphic indicating the candidate position on a road included in a map image.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 17A-17B show data used in the assistance device of embodiment 5;

FIG. 18 shows other data used in the assistance device of embodiment 5; and

DETAILED DESCRIPTION

The invention will now be described by reference to the preferred embodiments. This does not intend to limit the scope of the present invention, but to exemplify the invention.

Embodiment 1

A brief summary will be given before describing the present disclosure in specific details. Embodiment 1 of the present disclosure relates to an assistance device configured to support switching from the automatic driving mode to the manual driving mode in a vehicle capable of executing the automatic driving mode and the manual driving mode. In the automatic driving mode, the speed and steering angle of the vehicle are controlled by a computer (automatic driving control device). In the manual driving mode, on the other hand, the speed, steering angle, etc. of the vehicle are controlled by the driving manipulation of the driver. When the driving mode of the vehicle is switched from the automatic driving mode to the manual driving mode, it is desired to let the driver know a position that is a candidate where switching take place (hereinafter, "candidate position"). The candidate position can be said to be a position suitable for switching. Further, the candidate position is not limited to one spot but may be a section having a certain length. The assistance device according to this embodiment communicates at least one of a distance to the candidate position, a period of time expected to elapse until the candidate position is reached, and a point of time when the candidate position is expected to be reached.

Figure 1:
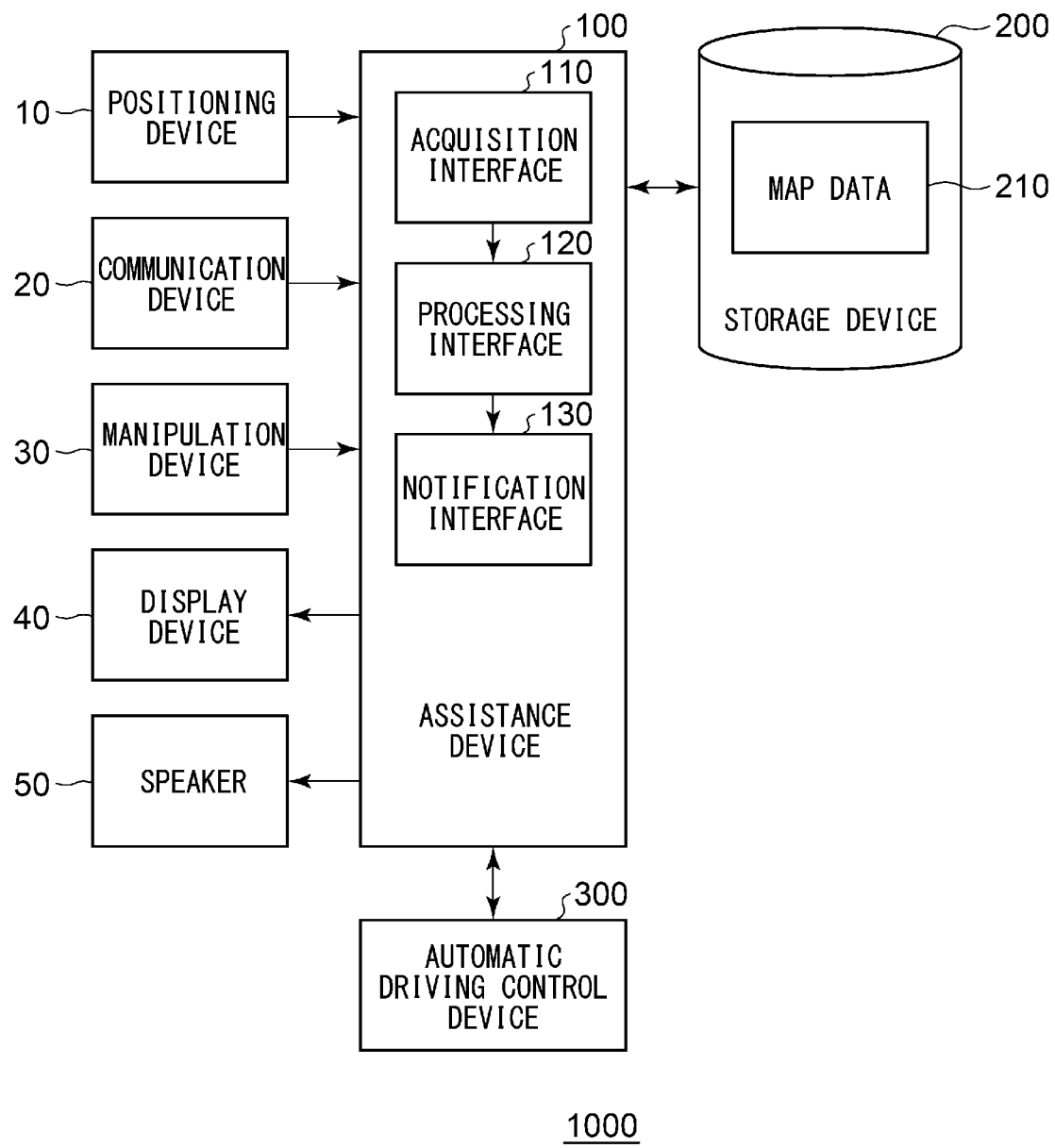
FIG. 1 shows a configuration of a vehicle according to embodiment 1.

FIG. 1 shows a configuration of a vehicle 1000. The vehicle 1000 includes a positioning device 10, a communication device 20, a manipulation device 30, a display device 40, a speaker 50, an assistance device 100, a storage device 200, and an automatic driving control device 300. The assistance device 100 includes an acquisition interface 110, a processing interface 120, and a notification interface 130, and the storage device 200 includes map data 210. The devices shown in FIG. 1 may be connected by dedicated cables or connected by wire communication such as a controller area network (CAN). Alternatively, the devices may be connected by cable communication or wireless communication such as universal serial bus (USB), Ethernet (registered trademark), Wi-Fi (registered trademark), and Bluetooth (registered trademark).

The vehicle 1000 is capable of executing the automatic driving mode and the manual driving mode, and one of the modes is selected to drive the vehicle. In the manual driving mode, for example, the vehicle 1000 travels according to the manual driving manipulation by the driver. The manual driving manipulation by the driver includes adjustment of the steering angle according to the steering and adjustment of the speed according to the manipulation of the accelerator pedal or the brake pedal. In the automatic driving mode, on the other hand, the vehicle 1000 travels automatically along, for example, a road.

The automatic driving control device 300 is an automatic driving controller implementing automatic driving control function and executes driving control in the automatic driving mode. The automatic driving control device 300 acquires sensing data from sensors (not shown) provided in the vehicle 1000. The sensors include, for example, an accelerator pedal sensor and a brake pedal sensor. Further, the automatic driving control device 300 controls the driving of the vehicle 1000 based on the sensing data, the map data 210 stored in the storage device 200, the route information, the traffic information, etc. The control may be implemented by using a publicly known technology and includes automatic steering and automatic speed adjustment. One example of automatic steering is lane keeping assist (LKA), and one example of automatic speed adjustment is adaptive cruise control (ACC).

The positioning device 10 calculates the position information on the vehicle 1000 based on the positioning information transmitted from a global navigation satellite system(s) (GNSS) satellite. The position information may be indicated by latitude and longitude. The communication device 20 can execute wireless communication and acquires public transportation information from an information provision system. The information provision system is, for example, a vehicle information and communication system (VICS) (registered trademark). The public transportation information includes, for example, information on a traffic jam situation on the road around the vehicle 1000 and on a site of occurrence of a traffic accident. Further, the communication device 20 may execute wireless communication other than wireless communication with the information provision system.

The manipulation device 30 is a user interface device configured to acknowledge a manipulation input from the driver. For example, the manipulation device 30 is a touch panel, a lever, a button, a switch, a controller such as a joystick and a volume, a sensor such as a camera for recognizing a gesture in a contactless manner, a sensor such as a microphone for recognizing sound, or a combination thereof. The manipulation device 30 acknowledges, for example, a manipulation from the driver for switching the automatic driving mode to the manual driving mode (hereinafter, "switching manipulation").

The storage device 200 is a semiconductor memory or a non-volatile memory, or a storage medium and can store digital data. The semiconductor memory is, for example, a random access memory (RAM), a read only memory (ROM), a flash memory, or a synchronous dynamic RAM (SDRAM). The non-volatile memory is, for example, a erasable programmable ROM (EPROM) or a electrically erasable programmable ROM (EEPROM). The storage medium is, for example, a solid state drive (SSD) or a hard disk drive (HDD). The map data 210 is map information, and the map information includes information related to roads and intersections. The information on roads includes information on a lane that forms the road and information on a standard speed of the vehicle traveling on the road. A portion or the entirety of the map data 210, a portion or the entirety of the route information, or a portion or the entirety of the traffic information may be stored on a cloud.

The assistance device 100 is a device for supporting mode switching from the automatic driving mode to the manual driving mode and is mounted to, for example, a vehicle-mounted device such as a navigation system. The assistance device 100 may be provided independent of the vehicle-mounted device or may be mounted to the automatic driving control device 300.

The acquisition interface 110 acquires the position information from the positioning device 10 and acquires the public transportation information from the communication device 20. Further, the acquisition interface 110 acquires the map data 210 of a range that convers the coordinates indicated by the position information from the storage device 200. Hereinafter, the map data 210 acquired by the acquisition interface 110 is also referred to as the map data 210. The map data 210 covers a range of, for example, 100 m-several km in front of the vehicle 1000. The map data 210 and the public transportation information can be said to be data indicating the situation around the vehicle 1000. When the manipulation device 30 acknowledges a switching manipulation from the driver, the acquisition interface 110 acquires an instruction for switching the automatic driving mode to the manual driving mode (hereinafter, "switching instruction").

When the switching instruction is acknowledged while the automatic driving mode is being in effect, the processing interface 120 derives, based on the map data 210 acquired by the acquisition interface 110, a candidate position that is a candidate of the position where the mode switching should be executed. For example, the processing interface 120 calculates the radius of curvature on a route that the vehicle 1000 should travel on and derives the position with the largest radius of curvature as the candidate position, the radius of curvature being an indicator of the road shape in the direction of travel of the vehicle 1000. The route is already derived, and the candidate position is indicated by the latitude and longitude. The candidate position is a position with the largest radius of curvature and so is a position closest to a straight line. The position closest to a straight line is the safest position for mode switching, and so the candidate position can be said to be a position suitable for switching.

If the candidate position is located near a location of an obstacle, a section of a traffic jam, or a spot of occurrence of a traffic accident, it is not desired to switch the mode at the candidate position. To address this, the processing interface 120 discards the candidate position if the information related to an obstacle, a condition of a traffic jam, or a spot of occurrence of a traffic accident is included in the public transportation information, and if the location of an obstacle, the section of a traffic jam, or the spot of occurrence of a traffic accident is within a certain distance from the candidate position. Further, the processing interface 120 derives a position with the next largest radius of curvature as the candidate position.

Further, the processing interface 120 may derive N (N>1) candidate positions. In that process, the processing interface 120 derives each of the N positions as a candidate position in the descending order of radius of curvature. Further, the processing interface 120 may define a section of a certain distance on the route before the candidate position as being a candidate position. In that process, the candidate position is indicated by the latitude and longitude of the starting point and the latitude and longitude of the end point.

The processing interface 120 derives a distance from the position information acquired by the acquisition interface 110 (hereinafter, also referred to as "current position") to the candidate position. Further, the processing interface 120 derives a period of time elapsed from the current position before the candidate position by also using the information on the standard speed of travel on the road included in the map data 210. Further, the processing interface 120 derives a point of time when the candidate position is expected to be reached by also using the information on the standard speed of travel on the road included in the map data 210. The processing interface 120 may derive at least one of the distance to the candidate position, the period of time elapsed until the candidate position is reached, and the point of time when the candidate position is expected to be reached. A portion or the entirety of the steps executed in the processing interface 120 may be executed on a cloud.

The notification interface 130 generates an image for communicating the candidate position derived by the processing interface 120. For example, the notification interface 130 generates an image in which the candidate position is superimposed (hereinafter, also referred to as "map image") at the coordinates for the candidate position in the image extracted from the map data 210 (hereinafter, "map image"). In that process, the candidate position is superimposed on a route shown in the map image. When a plurality of candidate positions are derived by the processing interface 120, a plurality of candidate positions are superimposed on the map image. Further, the notification interface 130 may generate an image in which one or more candidate positions are arranged sequentially (hereinafter, referred to as "list image").

Figure 2A:
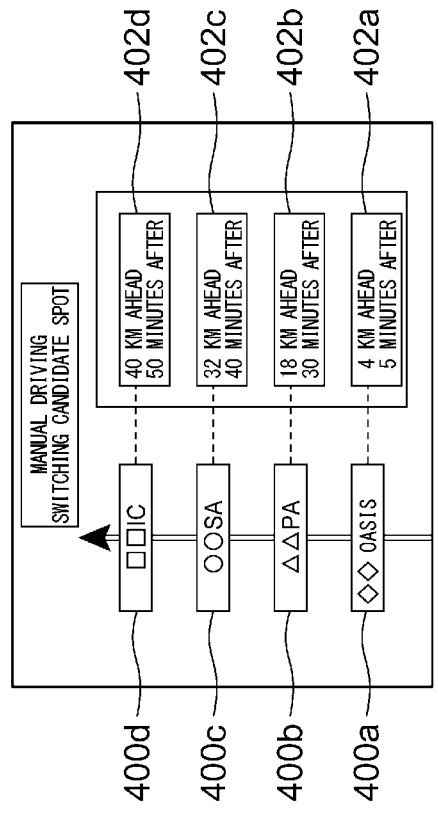
FIGS. 2A-2B show images displayed on the display device of FIG. 1.
Figure 2B:
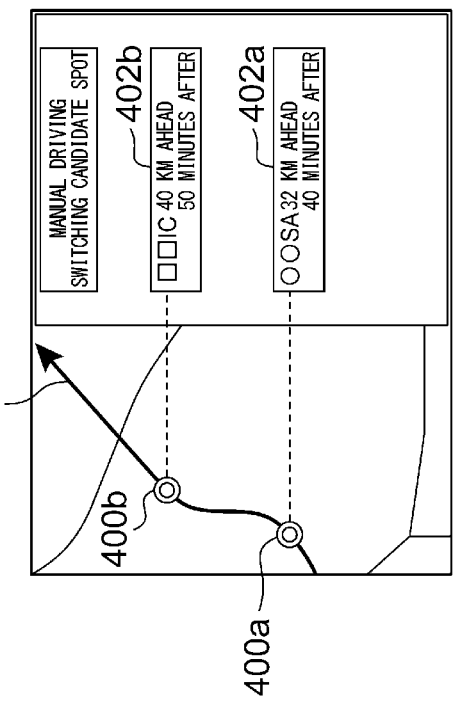

The display device 40 is, for example, a head-up display (HUD) or a center display and can display images or information. FIGS. 2A-2B show images displayed on the display device 40. FIG. 2A is a map image generated by the notification interface 130, showing a route 410 and showing a first candidate position 400*a* and a second candidate position 400*b* on the route 410. Further, first candidate position information 402*a* is shown to correspond to the first candidate position 400*a*, and second candidate position information 402*b* is shown to correspond to the second candidate position 400*b*. The first candidate position information 402*a* and the second candidate position information 402*b* indicate the distance to the candidate position 400 and the period of time elapsed until the candidate position 400 is reached. The point of time when the candidate position 400 is expected to be reached may be indicated.

FIG. 2B is a list image generated by the notification interface 130 in which the first candidate position 400*a* through the fourth candidate position 400*d* are arranged. Further, the first candidate position information 402*a* through the fourth candidate position information 402*d* are shown to correspond to the first candidate position 400*a* through the fourth candidate position 400*d*. The first candidate position information 402*a* through the fourth candidate position information 402*d* indicate the distance to the candidate position 400 and the period of time elapsed until the candidate position 400 is reached. The point of time when the candidate position 400 is expected to be reached may be indicated.

The notification interface 130 generates sound for communicating the candidate position 400 derived by the processing interface 120. The notification interface 130 outputs sound from the speaker 50. In that process, the sound for at least one of the distance to the candidate position 400, the period of time elapsed until the candidate position 400 is reached, and the point of time when the candidate position 400 is expected to be reached may be output from the speaker 50.

The features are implemented in hardware such as a central processing unit (CPU), a memory, or other large scale integration (LSI) of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 3:
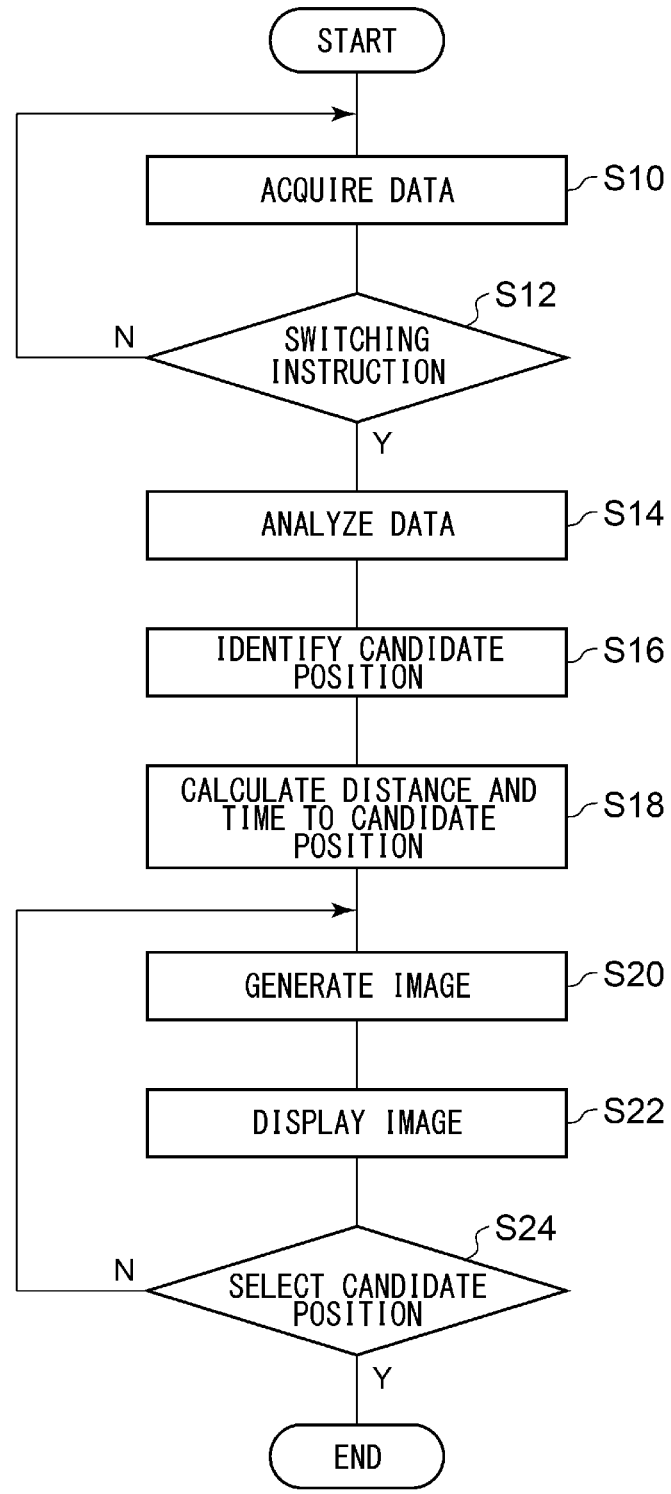
FIG. 3 is a flowchart showing a sequence of steps performed by the assistance device of FIG. 1.

A description will be given of the operation of the assistance device 100 having the above-described configuration. FIG. 3 is a flowchart showing a sequence of steps performed by the assistance device 100. The acquisition interface 110 acquires data (S10). In the absence of a switching instruction (N in S12), control returns to step 10. When a switching instruction is acknowledged (Y in S12), the processing interface 120 analyzes the data (S14) and identifies the candidate position 400 (S16). The processing interface 120 calculates the distance and time to the candidate position 400 (S18). The notification interface 130 generates an image (S20) and displays the image on the display device 40 (S22). When the switching of the driving mode is not completed (N in S24), control returns to step 20. When the switching of the driving mode is completed (Y in S24), the process is terminated.

According to this embodiment, at least one of the distance to the candidate position 400, the period of time elapsed until the candidate position 400 is reached, and the point of time when the candidate position 400 is expected to be reached is communicated so that it is possible to let the driver know the candidate position 400 in a manner easy to understand. Since the candidate position 400 is made known to the driver in a manner easy to understand, the driver can prepare for manual driving.

Embodiment 2

A description will now be given of embodiment 2. Like embodiment 1, embodiment 2 relates to an assistance device for supporting switching from the automatic driving mode to the manual driving mode. In embodiment 2, too, the distance to the candidate position, etc. is displayed as well as the candidate position. Embodiment 1 and embodiment 2 differ in terms of the timing of displaying the candidate position, the distance to the candidate position, etc. The vehicle 1000 according to embodiment 2 is of the same type as that of FIG. 1. The description below highlights a difference from embodiment 1.

In embodiment 2, the manipulation device 30 and the display device 40 of FIG. 1 may be integrated as a touch panel. When the vehicle 1000 travels in the automatic driving mode, the processing interface 120 generates the route 410 and generates a map image showing the route 410. FIGS. 4A-4D show images displayed on the display device 40. FIG. 4A is a map image generated by the processing interface 120 showing the route 410. The processing interface 120 derives one or more candidate positions 400 but the candidate positions 400 are not shown on the map image.

Figure 4B:
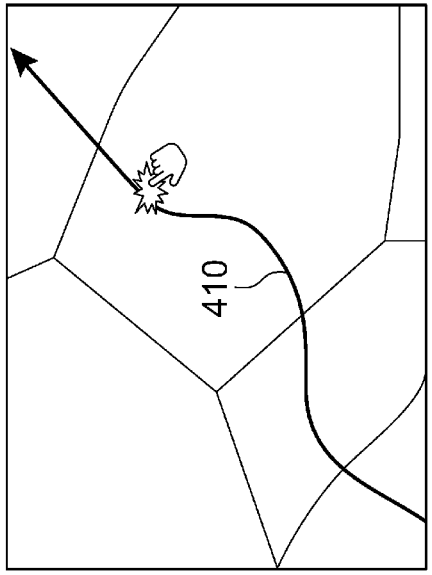
FIGS. 4A-4D show images displayed on the display device of embodiment 2.
Figure 4D:
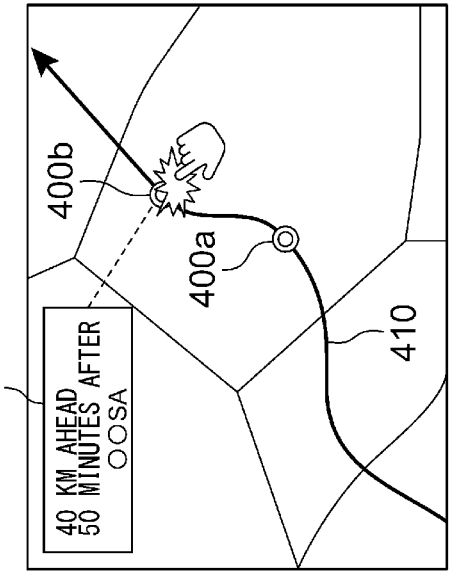
Figure 4A:
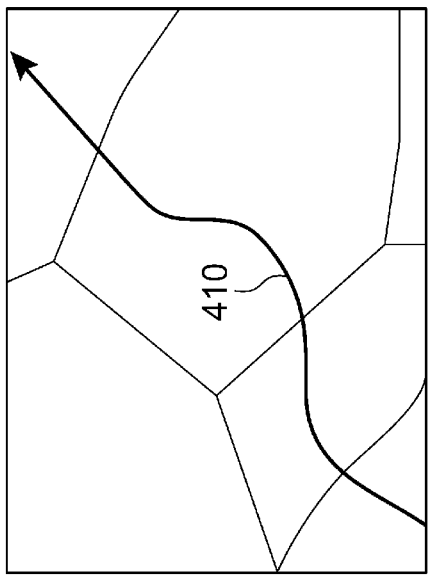
Figure 4C:
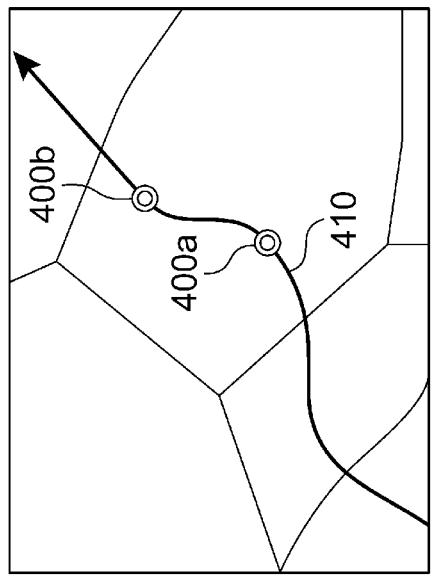

As shown in FIG. 4B, the driver touches the route 410 shown on the display device 40 with a finger. As a result, the manipulation device 30 acknowledges a user operation of the driver to display the candidate position 400. In response, the processing interface 120 displays a map image on which the candidate position 400 is superimposed. In this case, the candidate position 400 is displayed as the first candidate position 400a and the second candidate position 400b. To select the second candidate position 400b, the driver touches the second candidate position 400b on the map image with a finger, as shown in FIG. 4D. In response, the notification interface 130 displays the second candidate position information 402b corresponding to the second candidate position 400b on the display device 40.

Figure 5:
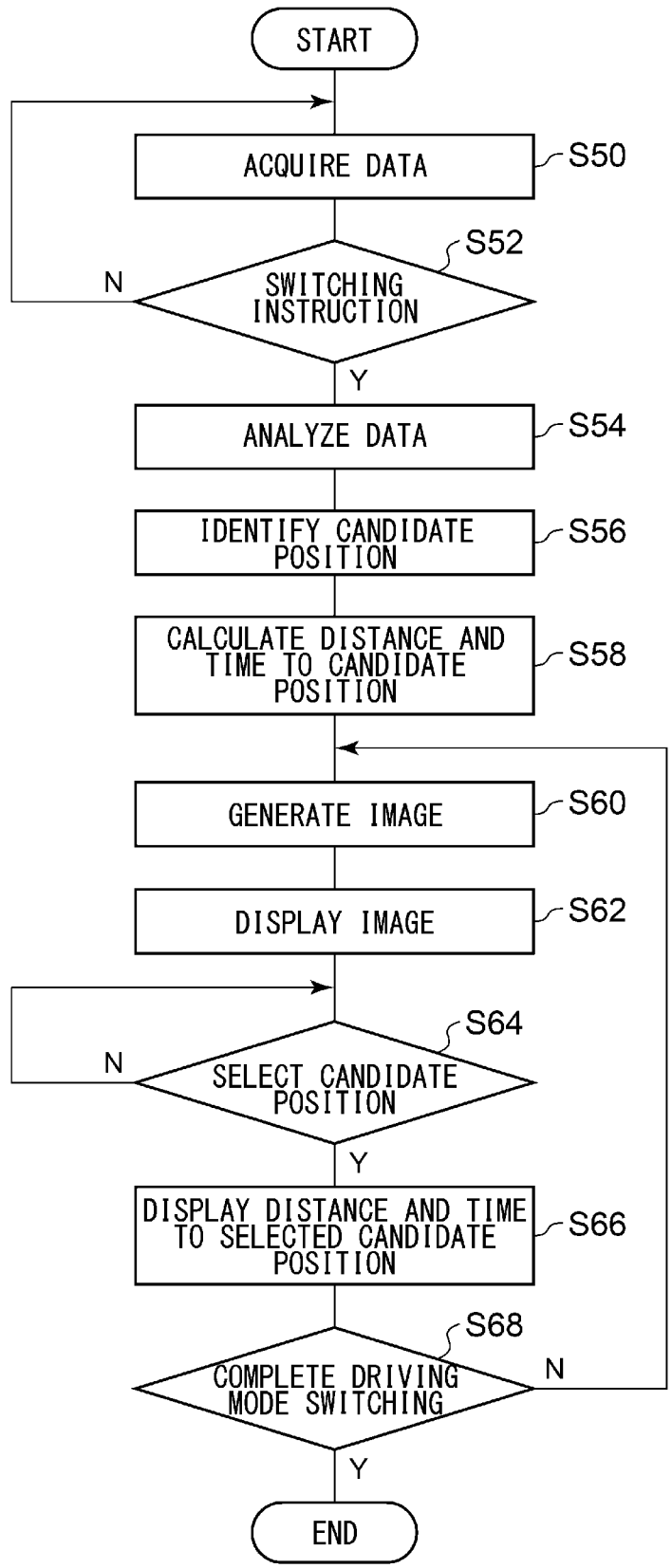
FIG. 5 is a flowchart showing a sequence of steps performed by the assistance device of embodiment 2.

A description will be given of the operation of the assistance device 100 having the above-described configuration. FIG. 5 is a flowchart showing a sequence of steps performed by the display device 40. The acquisition interface 110 acquires data (S50). In the absence of a switching instruction (N in S52), control returns to step 50. When a switching instruction is acknowledged (Y in S52), the processing interface 120 analyzes the data (S54) and identifies the candidate position 400 (S56). The processing interface 120 calculates the distance and time to the candidate position 400 (S58). The notification interface 130 generates an image (S60) and displays the image on the display device 40 (S62). When a selection of the candidate position 400 is not acknowledged (N in S64), the system stands by. When a selection of the candidate position 400 is acknowledged (Y in S64), the notification interface 130 displays the distance and time to the selected candidate position 400 on the display device 40 (S66). When the switching of the driving mode is not completed (N in S68), control returns to step 60. When the switching of the driving mode is completed (Y in S68), the process is terminated.

According to this embodiment, the candidate position 400 and the candidate position information 402 are displayed when the driver touches the route 410 displayed on the display device 40 with a finger. It is therefore possible to let the driver know the candidate position 400 in a manner easy to understand. If the driver does not touch the route 410 displayed on the display device 40, the candidate position 400 and the candidate position information 402 are not displayed so that unnecessary information is prevented from being displayed.

Embodiment 3

A description will now be given of embodiment 3. Like the foregoing embodiments, embodiment 3 relates to an assistance device for supporting switching from the automatic driving mode to the manual driving mode. In embodiment 3, too, the distance to the candidate position, etc. is displayed as well as the candidate position. In embodiments 1, 2, the candidate position is derived and displayed in response to the switching manipulation performed by the driver in the vehicle in the automatic driving mode. In embodiment 3, however, the driver in the vehicle in the automatic driving mode does not perform a switching manipulation. The assistance device autonomously derives the candidate position by acquiring road conditions through the public transportation information. The vehicle 1000 according to embodiment 3 is of the same type as that of FIG. 1. The description below highlights a difference from the foregoing embodiments.

Figure 6A:
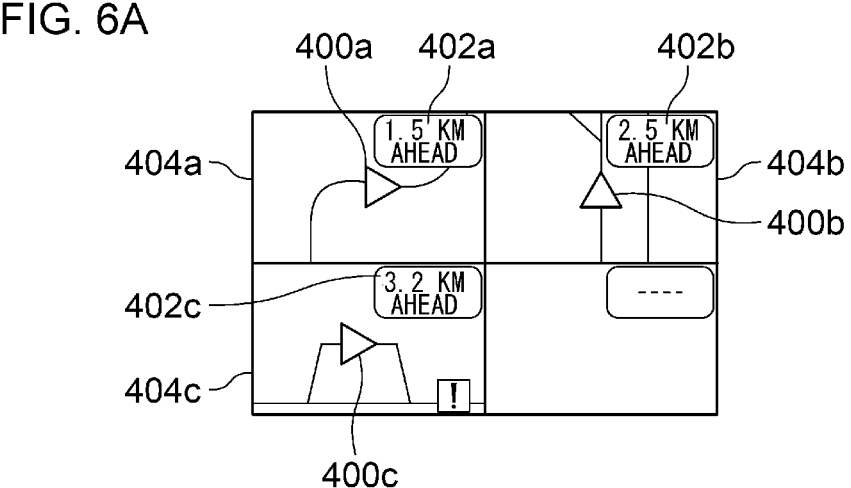
FIGS. 6A-6C show images displayed on the display device of embodiment 3.
Figure 6B:
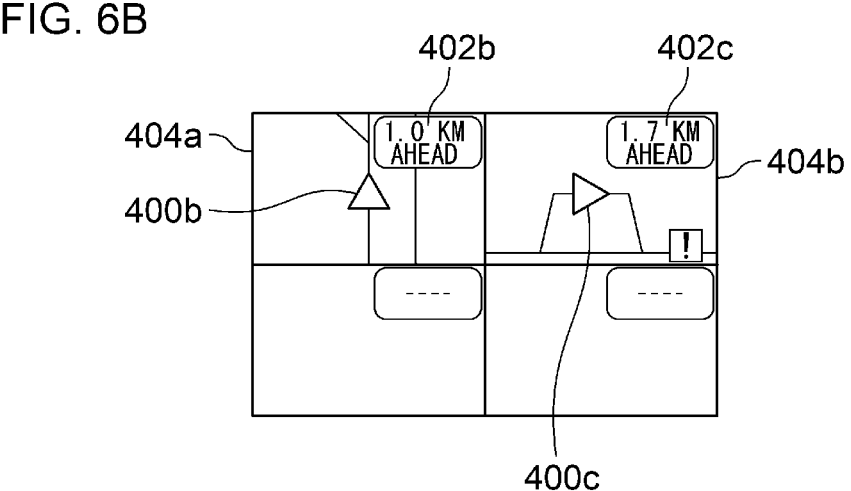
Figure 6C:
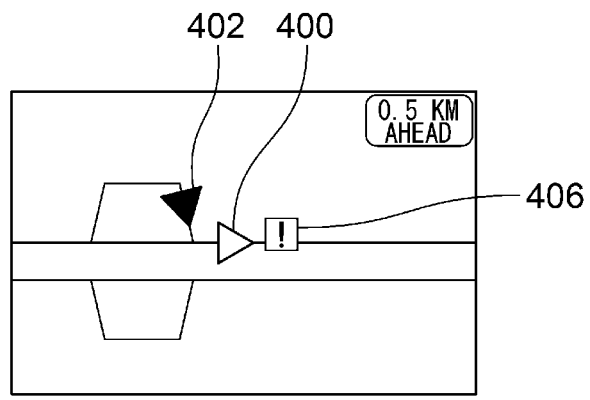

The processing interface 120 of FIG. 1 derives a plurality candidate positions 400 and a plurality of items of candidate position information 402 as in the foregoing embodiments. When displaying the plurality of candidate positions 400 and the plurality of items of candidate position information 402, the notification interface 130 segments the screen into a plurality of blocks and displays a combination of the candidate position 400 and the candidate position information 402 in each block. FIGS. 6A-6C show images displayed on the display device 40. Referring to FIG. 6A, the screen is segmented into a first block 404a through a third block 404c. The first candidate position 400a and the first candidate position information 402a are displayed in the first block 404a, the second candidate position 400b and the second candidate position information 402b are displayed in the second block 404b, and a third candidate position 400c and third candidate position information 402c are displayed in the third block 404c. The first candidate position 400a is closest to a current position 420 of the vehicle 1000, and the third candidate position 400c is farthest. The driver touches one of the blocks 404 to cause the manipulation device 30 to acknowledge an instruction to select the candidate position 400.

When the vehicle 1000 travels, maintaining the automatic driving mode, to pass the first candidate position 400a, the notification interface 130 updates the screen not to display the first candidate position 400a that has been passed.

Referring to FIG. 6B, the screen is segmented into the first block 404a and the second block 404b. The second candidate position 400b and the second candidate position information 402b are displayed in the first block 404a, and the third candidate position 400c and the third candidate position information 402c are displayed in the second block 404b. Reference is made back to FIG. 1.

Hereinafter, it is assumed that the third candidate has also been passed, and the processing interface 120 cannot derive the candidate position 400. In this case, the processing interface 120 sets the candidate position 400 before the position of a switching factor such as an accident extracted from the public transportation information (hereinafter, "factor position") FIG. 6C shows a screen shown when the processing interface 120 cannot derive the candidate position 400. The candidate position 400 is displayed before a factor position 406.

Figure 7:
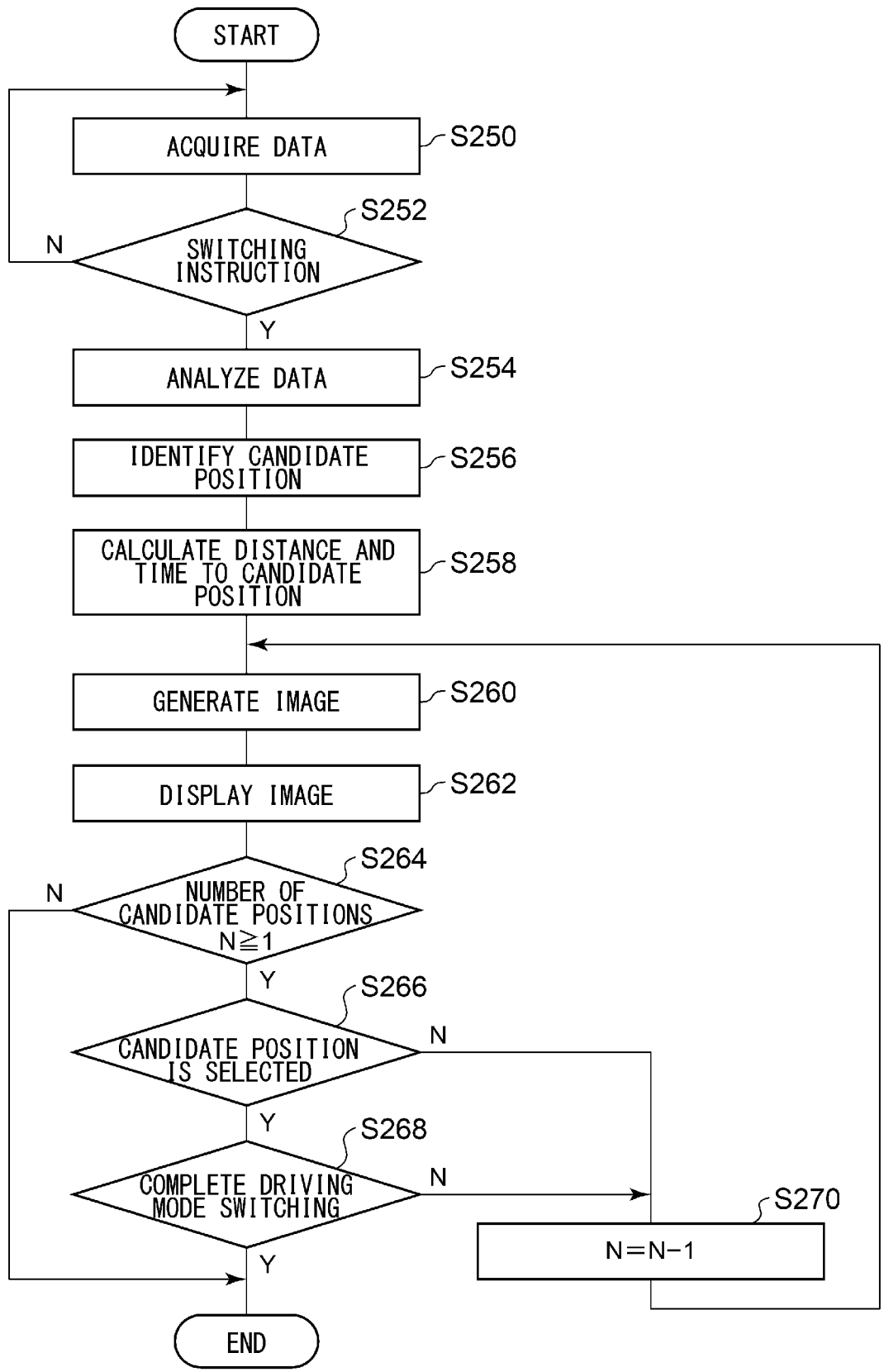
FIG. 7 is a flowchart showing a sequence of steps performed by the assistance device of embodiment 3.

A description will be given of the operation of the assistance device 100 having the above-described configuration. FIG. 7 is a flowchart showing a sequence of steps performed by the assistance device 100. The acquisition interface 110 acquires data (S250). In the absence of a switching instruction (N in S252), control returns to step 250. When a switching instruction is acknowledged (Y in S252), the processing interface 120 analyzes the data (S254) and identifies the candidate position 400 (S256). The processing interface 120 calculates the distance and time to the candidate position 400 (S258). The notification interface 130 generates an image (S260) and displays the image on the display device 40 (S262). When the number N of the candidate positions 400 is 1 or larger (Y in S264), the candidate position 400 is selected (Y in S266) and the switching of the driving mode is completed (Y in S268), the process is terminated. When the number N of the candidate positions N is not 1 or larger (N in S264), the process is terminated. When the candidate position 400 is not selected before the closest candidate position, of the candidate positions 400, is passed (N in S266), or when the switching of the driving mode is not completed (N in S268), 1 is subtracted from N (S270), and control returns to step 260.

According to this embodiment, a plurality of candidate positions 400 and a plurality of items of candidate position information 402 are displayed. It is therefore possible to let the driver know the plurality of candidate positions 400 and the plurality of items of candidate position information 402. Further, the candidate position 400 and the candidate position information 402 that have been passed are not displayed so that unnecessary information is prevented from being displayed.

Embodiment 4

A description will now be given of embodiment 4. Like the foregoing embodiments, embodiment 4 relates to an assistance device for supporting switching from the automatic driving mode to the manual driving mode. In the foregoing embodiments, the distance to the candidate position, etc. is displayed as well as the candidate position. Embodiment 4 relates to various types of display to let the driver know the position where the driving mode should be switched in a manner easy to understand. The vehicle 1000 according to embodiment 4 is of the same type as that of FIG. 1. The description below highlights a difference from embodiment 1.

Figure 8:
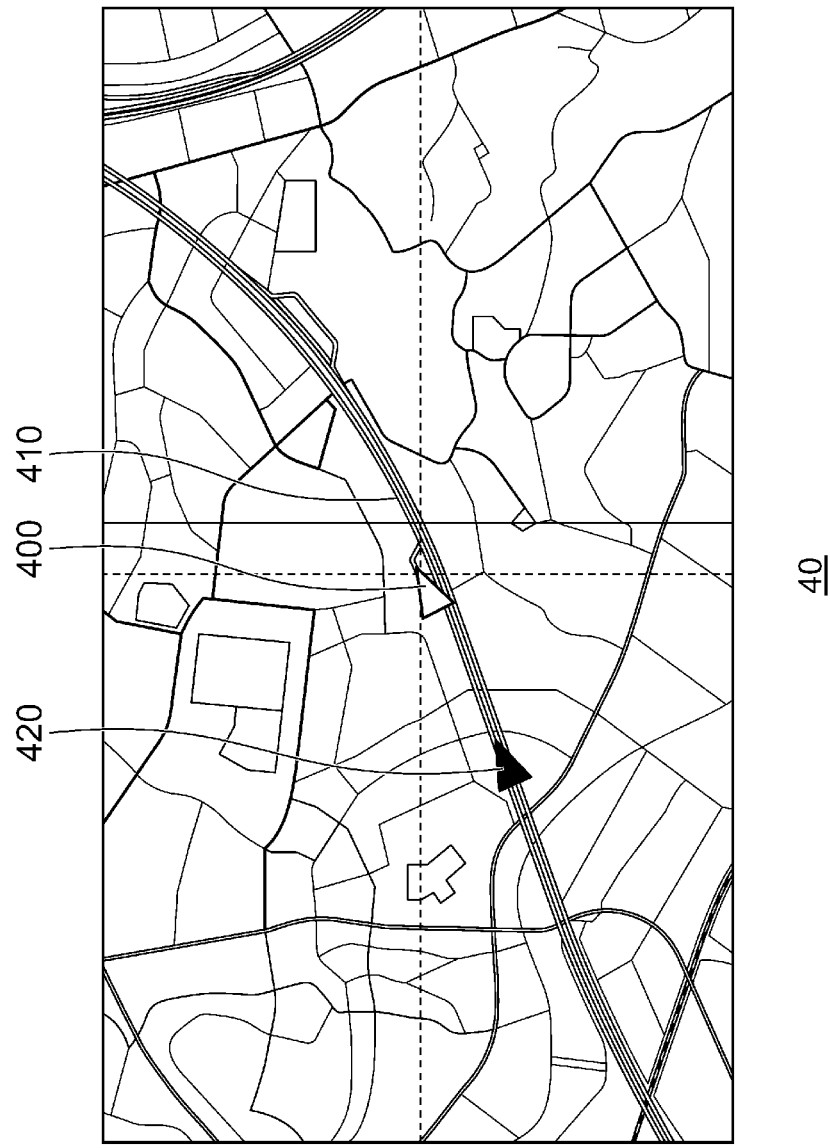
FIG. 8 shows an image displayed on the display device of embodiment 4.

As in the foregoing embodiments, when a switching instruction is acknowledged while the automatic driving mode is being in effect, the processing interface 120 derives the candidate position based on the map data 210 acquired by the acquisition interface 110, and the notification interface 130 generates an image for communicating the candidate position 400 derived by the processing interface 120. FIG. 8 shows an image displayed on the display device 40. The notification interface 130 displays the candidate position 400 at the coordinates for the candidate position 400 on the road, and, in particular, the route 410, included in the map image. The candidate position 400 is displayed as a graphic indicating the candidate position 400. Further, the notification interface 130 displays the current position 420 at the coordinates for the current position on the route 410 included in the map image. The current position 420 is displayed as a graphic indicating the current position. In other words, the candidate position 400 and the current position 420 are included in the same map image. In this case, the candidate position 400 and the current position 420 are displayed as the same graphic.

Figure 9B:
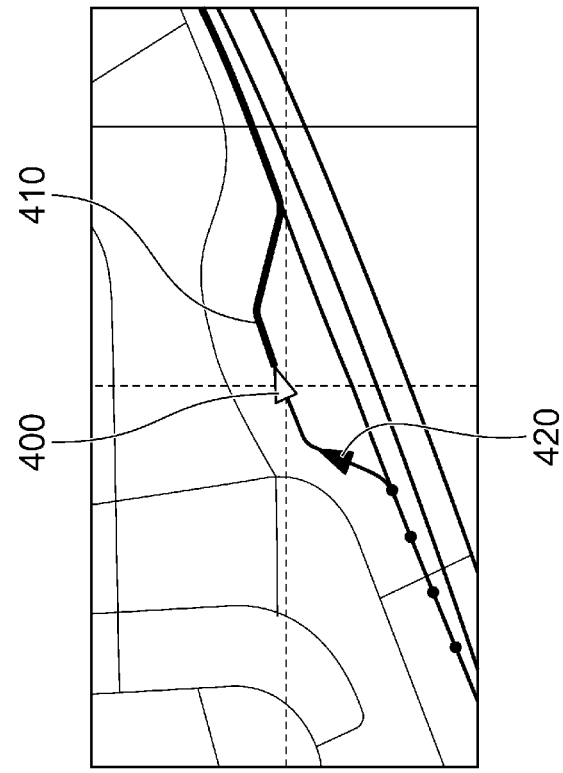
FIGS. 9A-9B show alternative images displayed on the display device of embodiment 4.
Figure 9A:

FIGS. 9A-9B show alternative images displayed on the display device 40. FIG. 9A shows an image generated by the notification interface 130 and is equivalent to the image in FIG. 8. The candidate position 400 is placed at the center of the map image. In the ordinary navigation system, on the other hand, the current position 420 instead of the candidate position 400 is displayed at the center of the map image.

Further, the notification interface 130 may change the scale of the map image in accordance with the relationship between the current position 420 and the candidate position 400 (e.g., the distance). To describe it more specifically, the smaller the distance between the current position 420 and the candidate position 400, the larger the scale of the map image configured by the notification interface 130. In FIG. 9B, the distance between the current position 420 and the candidate position 400 is smaller as compared with that of FIG. 9A so that the scale is configured to be larger than that of FIG. 9A. In other words, the closer the current position 420 gets to the candidate position 400 due to the movement of the vehicle 1000, the larger the scale of the map image. The view of FIG. 9B may be referred to as "zoom view".

Figure 10A:
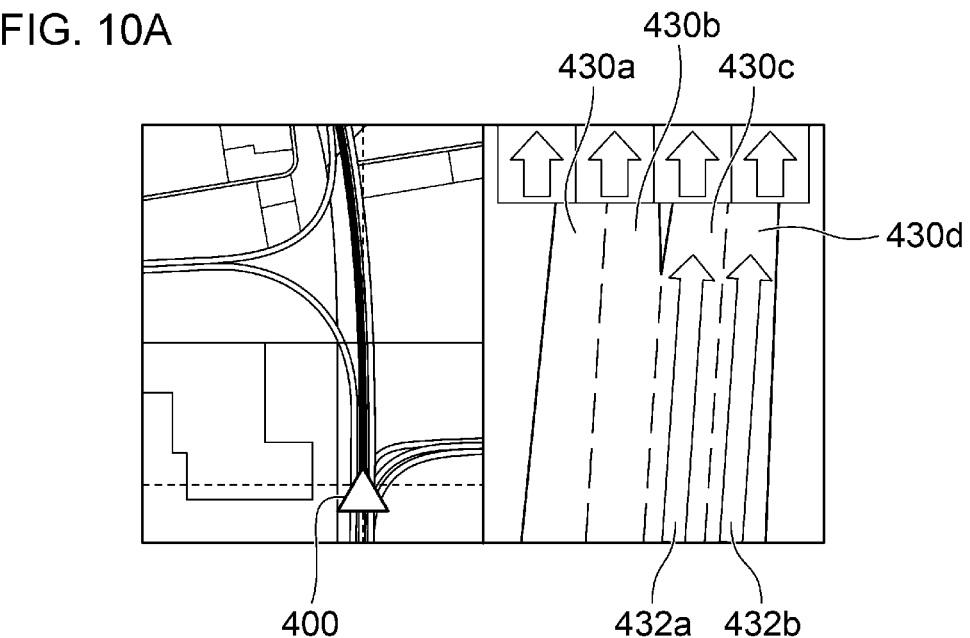
FIGS. 10A-10B show still alternative images displayed on the display device of embodiment 4.
Figure 10B:
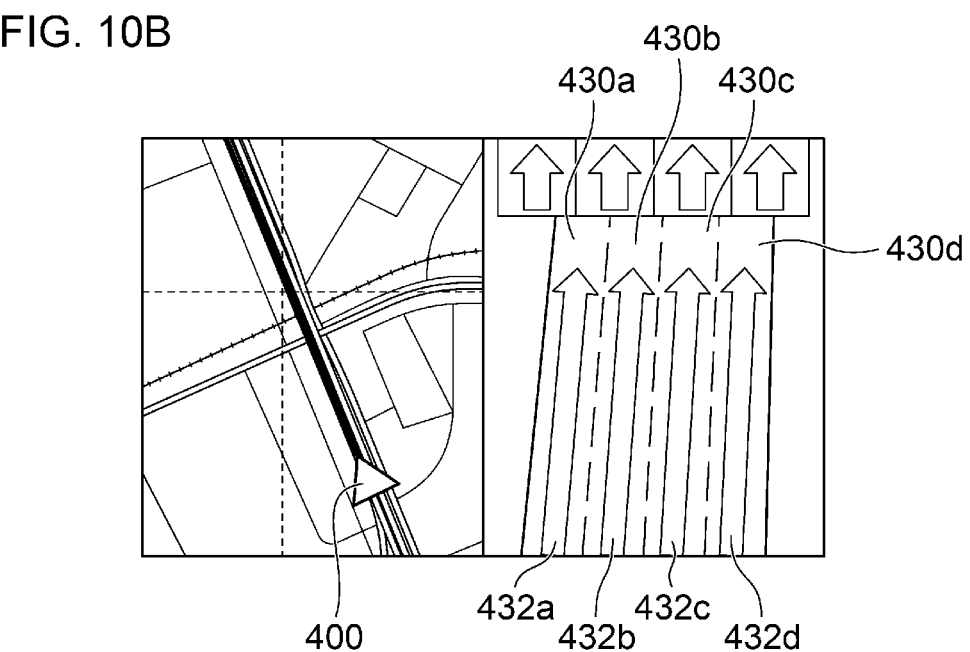

When the information on the road included in the map data 210 includes information on the number of lanes in the section including the candidate position 400 and the lane suitable for switching (hereinafter, "switching lane"), the notification interface 130 may display map images as shown in FIGS. 10A-10B. FIGS. 10A-10B show still alternative images displayed on the display device 40. FIG. 10A shows that the road is comprised of a first lane 430a through a fourth lane 430d before the candidate position 400, a first switching lane 432a is set in the third lane 430c, and a second switching lane 432b is set in the fourth lane 430d. The map image is shown on the left side of the screen, and an image of a plurality of lanes 430 is shown on the right side of the screen. In the image of the plurality of lanes 430, a first switching lane 432a superimposed on the third lane 430c and a second switching lane 432b superimposed on the fourth lane 430d are indicated by a symbol such as an arrow. The image lets the driver know that the third lane 430c and the fourth lane 430d are suitable for mode switching.

FIG. 10B shows that the road is comprised of a first lane 430a through a fourth lane 430d before the candidate position 400, and a switching lane 432 is set in all of the lanes 430. The map image is shown on the left side of the screen, and an image of a plurality of lanes 430 is shown on the right side of the screen. In the image of the plurality of lanes 430, the first switching lane 432a through a fourth switching lane 432d superimposed on the first lane 430a through the fourth lane 430d, respectively, are indicated by a symbol such as an arrow. The image lets the driver know that all of the lanes 430 are suitable for mode switching. The view like FIGS. 10A-10B may be referred to as "lane view". Reference is made back to FIG. 1.

When a junction on a general road or a junction on an expressway is located, the navigation system in the manual driving mode displays information on a junction point before the junction on a general road or the junction on an expressway. When the vehicle 1000 according to this embodiment is traveling in the automatic driving mode, it is not necessary to display information related to a junction point. When a junction on a general road or a junction on an expressway is located on a road expected to be passed beyond the candidate position 400, however, it is preferred to display information related to junction point even during the automatic driving mode. This is because the driver will travel on the junction on a general road or the junction on an expressway after the automatic driving mode is switched to the manual driving mode.

When a junction on a general road or a junction on an expressway is located on a road expected to be passed beyond the candidate position 400, therefore, the notification interface 130 displays, during the automatic driving mode, displays information related to the road, i.e., information related to the junction point. In that process, the notification interface 130 configures the point of time of displaying the information related to the junction point during the automatic driving mode to be earlier than the point of time of displaying the information on the junction point during the manual driving mode.

For example, the information related to the junction point is displayed 800 m before the junction on a general road in the manual driving mode, and the information related to the junction point is displayed 1.5 km before the junction on a general road in the automatic driving mode. Further, the information related to the junction point is displayed 2 km before the junction on an expressway in the manual driving mode, and the information related to the junction point is displayed 4 km before the junction on an expressway in the automatic driving mode. The level of the driver's attention during the automatic driving mode is often lower than the level of the driver's attention during the manual driving mode. Therefore, the attention of the driver during the automatic driving mode is attracted by communicating the information related to the junction point earlier. The information related to the junction point displayed during the automatic driving mode may be referred to as "post-switching route guidance".

Figure 11B:
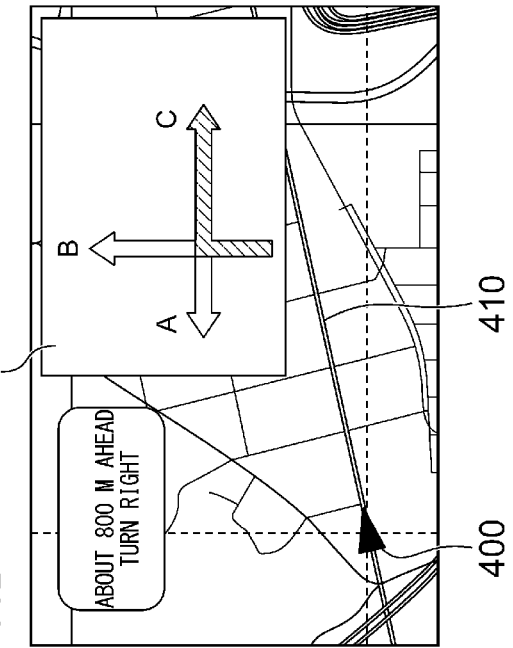
FIGS. 11A-11C show still alternative images displayed on the display device of embodiment 4.
Figure 11A:
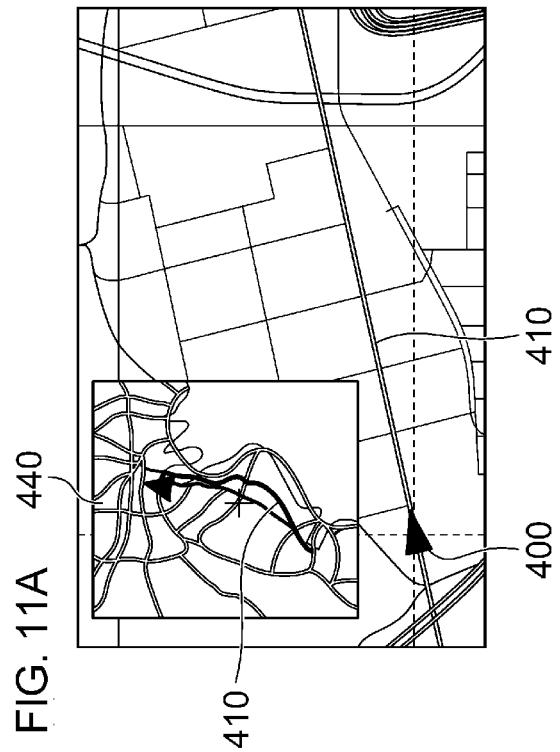
Figure 11C:
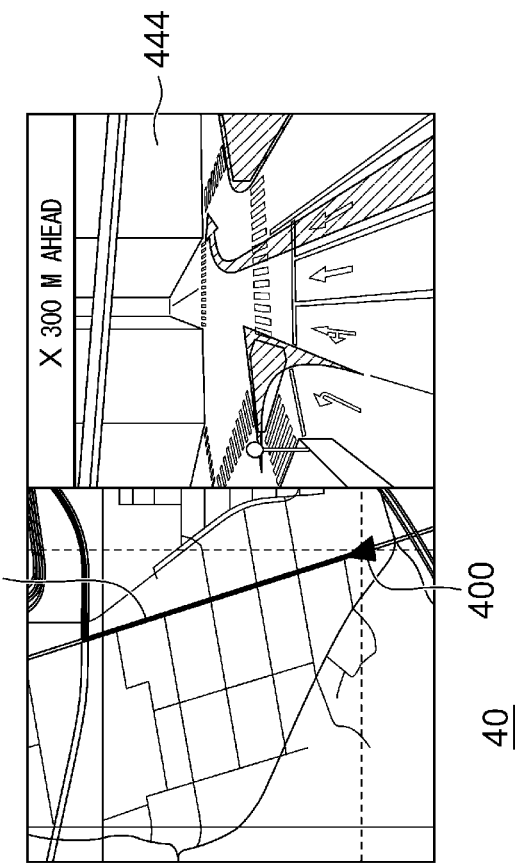

FIGS. 11A-11C show still alternative images displayed on the display device 40. The images correspond to the information related to the junction point mentioned above. Referring to FIG. 11A, wide area information 440 showing the route 410 in a wide area is displayed in addition to the map image including the candidate position 400 and the route 410. Referring to FIG. 11B, right-turn/left-turn information 442 indicating a left-turn destination, a straight-ahead destination, and a right-turn destination at the junction point is displayed in addition to the map image including the candidate position 400 and the route 410. Referring to FIG. 11C, stereoscopic information 444 showing the junction point stereoscopically is displayed in addition to the map image including the candidate position 400 and the route 410.

Figure 12A:
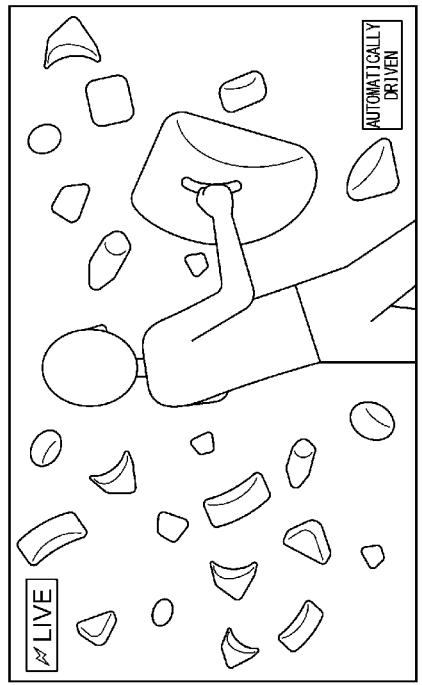
FIGS. 12A-12C show still alternative images displayed on the display device of embodiment 4.
Figure 12B:
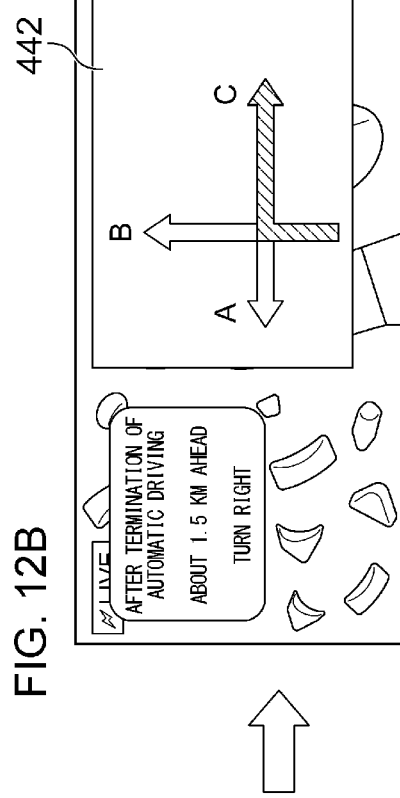
Figure 12C:
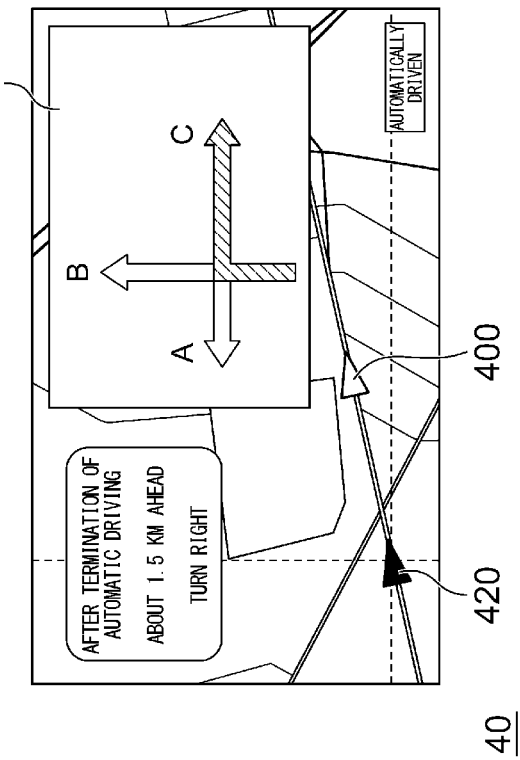

The images shown in FIGS. 11A-11C may be displayed in a situation in which the display device 40 of the vehicle 1000 in the automatic driving mode is displaying a content such as a television program. FIGS. 12A-12C show still alternative images displayed on the display device 40. FIG. 12A shows a screen displayed when the vehicle 1000 in the automatic driving mode has not reached a point 2 km before a junction on an expressway or a point 4 km before the junction. As illustrated, only the content may be displayed. FIG. 12B shows a screen displayed when the vehicle 1000 in the automatic driving mode has reached a point 2 km before a junction on an expressway or a point 4 km before the junction since the state in which the screen of FIG. 12A is displayed. The right-turn/left-turn information 442 is displayed in addition to the content. The wide area information 440 or the stereoscopic information 444 may be displayed in place of the right-turn/left-turn information 442.

Like FIG. 12B, FIG. 12C shows a screen displayed when the vehicle 1000 in the automatic driving mode has reached a point 2 km before a junction on an expressway or a point 4 km before the junction since the state in which the screen of FIG. 12A is displayed. The content is switched to the map image, and the right-turn/left-turn information 442 is displayed. The wide area information 440 or the stereoscopic information 444 may be displayed in place of the right-turn/left-turn information 442. Reference is made back to FIG. 1.

When the position information acquired by the acquisition interface 110 matches the candidate position 400, the processing interface 120 of the assistance device 100 determines to switch from the automatic driving mode to the manual driving mode. Upon determining to switch the mode, the processing interface 120 outputs an instruction to switch the mode to the automatic driving control device 300. The automatic driving control device 300 switches the mode from the automatic driving mode to the manual driving mode in response to the instruction to switch the mode. A publicly known technology may be used to switch the mode, so that a description thereof is omitted.

Figure 13A:
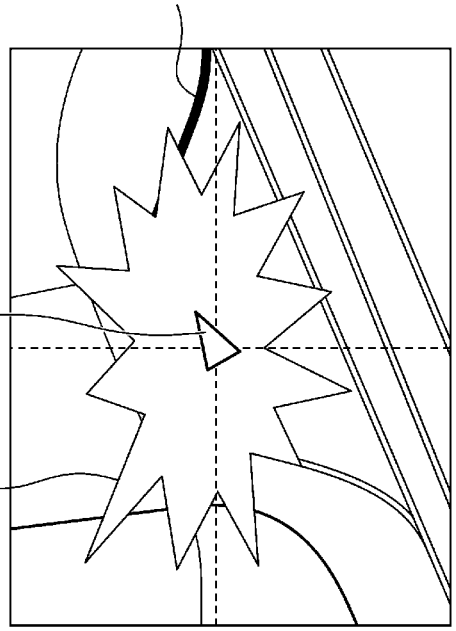
FIGS. 13A-13C show still alternative images displayed on the display device of embodiment 4.
Figure 13B:
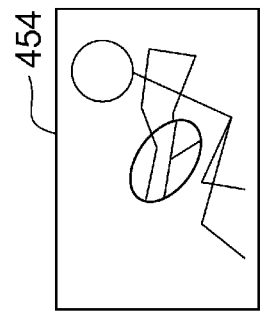
Figure 13C:
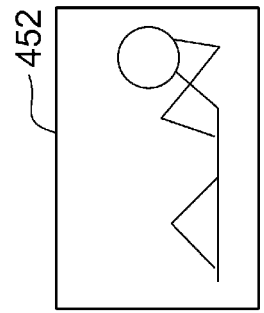

When the processing interface 120 determines to switch the mode, the notification interface 130 displays an image indicating that the mode has been switched on the display device 40. FIGS. 13A-13C show still alternative images displayed on the display device 40. FIG. 13A shows a map image on which the candidate position 400 is superimposed. Switching information 450 is highlighted to show that the mode has been switched. Aside from this, the notification interface 130 may display an automatic driving mode icon 452 shown in FIG. 13B in a part of the screen in the automatic driving mode and display a manual driving mode icon 454 shown in FIG. 13C in a part of the screen when the mode is switched to the manual driving mode. The automatic driving mode icon 452 is an icon to let know that the automatic driving mode is in effect, and the manual driving mode icon 454 is an icon to let know that the manual driving mode is in effect. Reference is made back to FIG. 1.

After the mode is switched, the processing interface 120 may derive the route 410 again to change to the route 410 suitable for the manual driving mode. Further, when the candidate position 400 is placed at the center of the map image as shown in FIG. 9A in the automatic driving mode, the notification interface 130 may display the map image to show the current position of the vehicle 10000 at the center after the mode is switched.

Figure 14:
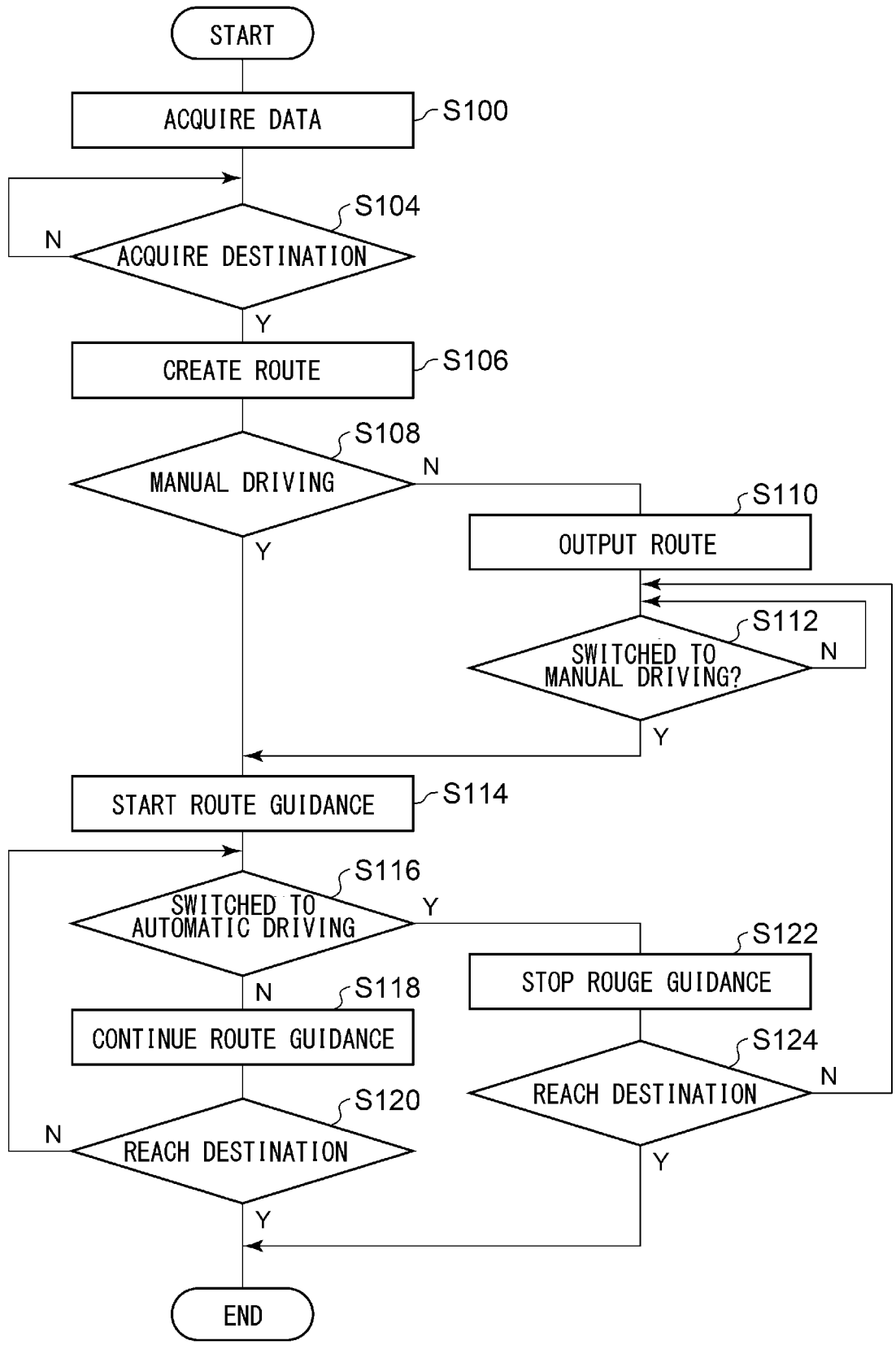
FIG. 14 is a flowchart showing a sequence of steps for guidance by the vehicle of embodiment 4.

A description will be given of the operation of the assistance device 100 having the above-described configuration. FIG. 14 is a flowchart showing a sequence of steps for guidance by the assistance device 100. The acquisition interface 110 acquires data including the current position (S100). When a destination is not acquired (N in S104), the processing interface 120 stands by. When a destination is acquired (Y in S104), the processing interface 120 creates a route 410 (S106). When the mode is not the manual driving mode (N in S108), the assistance device 100 outputs the route 410 to the automatic driving control device 300 (S110). When the mode is not switched to the manual driving mode (N in S112), the assistance device 100 stands by. When the mode is switched to the manual driving mode (Y in S112), the processing interface 120 stars route guidance (S114). When the mode is the manual driving mode (Y in S108), the processing interface 120 starts route guidance (S114).

When the mode is not switched to the automatic driving mode (N in S116), the processing interface 120 continues route guidance (S118). When the destination is not reached (N in S120), control returns to step 116. When the destination is reached (Y in S120), the process is terminated. When the mode is switched to the automatic driving mode (Y in S116), the processing interface 120 stops route guidance (S122). When the destination is not reached (N in S124), control returns to step 112. When the destination is reached (Y in S124), the process is terminated.

Figure 15:
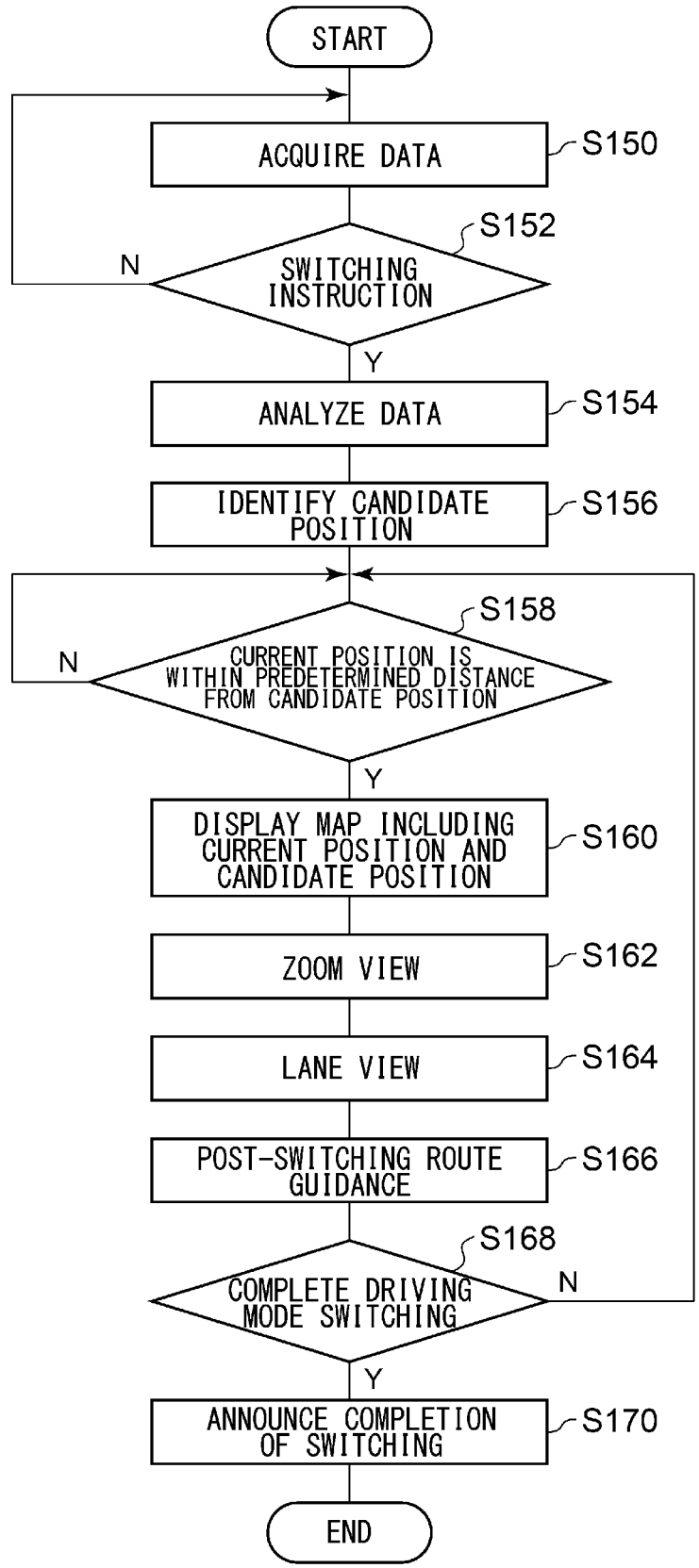
FIG. 15 is a flowchart showing a sequence of steps performed by the assistance device of embodiment 4.

FIG. 15 is a flowchart showing a sequence of steps performed by the assistance device 100. The sequence corresponds to step 112 of FIG. 14. The acquisition interface 110 acquires data (S150). In the absence of a switching instruction (N in S152), control returns to step 150. When a switching instruction is acknowledged (Y in S152), the processing interface 120 analyzes the data (S154) and identifies the candidate position 400 (S156). When the current position 420 is not within a predetermined distance from the candidate position 400 (N in S158), the assistance device 100 stands by. When the current position 420 is within a predetermined distance from the candidate position 400 (Y in S158), the notification interface 130 displays a map image including the current position 420 and the candidate position 400 (S160). The notification interface 130 executes zoom view (S162). The notification interface 130 executes lane view (S164). The notification interface 130 displays a post-switching route guidance (S166). When the switching of the driving mode is completed (Y in S168), the notification interface 130 lets know that the switching has been completed (S170). When the switching of the driving mode is not completed (N in S168), control returns to step 158.

Figure 16:
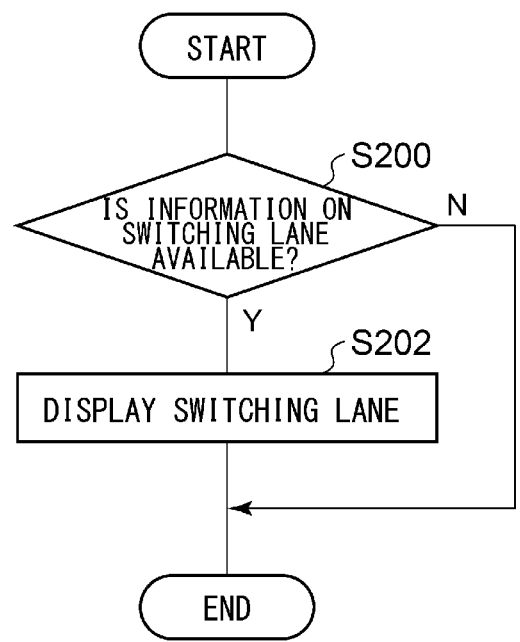
FIG. 16 is a flowchart showing a sequence of steps for display performed by the assistance device of embodiment 4.

FIG. 16 is a flowchart showing a sequence of steps for display performed by the assistance device 100. The sequence corresponds to step 164 of FIG. 15. When the information on a switching lane is included in the map data 210 (Y in S200), the notification interface 130 displays the switching lane (S202). When the information on a switching lane is not included in the map data 210 (N in S200), the process is terminated.

According to this embodiment, a graphic indicating the candidate position 400 is displayed on the route 410 included in the map image so that it is possible to let the driver know the candidate position 400 in a manner easy to understand. Further, the map image is displayed to show the candidate position 400 at the center so that it is made easy to recognize the candidate position 400. Further, the scale of the map image is changed in accordance with the relationship between the candidate position 400 and the current position 420 so that it is made easy to recognize the candidate position 400 and the current position 420. Further, the information related to a road expected to be passed beyond the candidate position 400 is also displayed so that it is possible to let the driver know the situation of the road since the switching to the manual driving mode. Further, an image indicating that the mode has been switched is displayed so that it is possible to let the driver know that the automatic driving mode has been switched to the manual driving mode. Further, the map image is displayed to show the current position 420 at the center when the mode is switched so that it is possible to let the driver know the current position 420 easily.

Embodiment 5

A description will be given of embodiment 5. The processing interface described so far derives the candidate position by considering the curvature of a road, location of an obstacle, a section of a traffic jam, and a spot of occurrence of a traffic accident as data indicating the situation around the vehicle. In embodiment 5, the candidate position is derived by using other data. The vehicle 1000 according to embodiment 5 is of the same type as that of FIG. 1. The description below highlights a difference from embodiment 1.

FIGS. 17A-17B show data used in the assistance device 100. FIG. 17A shows a list of data used to derive the candidate position 400 in the foregoing embodiments. FIG. 17B shows a list of data used to derive the candidate position 400 in embodiment 5. Two or more of these types of data may be used. FIG. 18 shows other data used in the assistance device 100. The other data shown in FIG. 18 may be used to derive the candidate position 400.

According to this embodiment, various data are used to derive the candidate position 400 so that the flexibility of the configuration is improved.

Embodiment 6

A description will now be given of embodiment 6. In the foregoing embodiments, the assistance device acknowledges a switching instruction, derives a candidate position, and displays an image showing the candidate position. In embodiment 6, these processes may be executed by the assistance device and the automatic driving control device in coordination. The vehicle 1000 according to embodiment 6 is of the same type as that of FIG. 1. The description below highlights a difference from the foregoing embodiments.

The acquisition interface 110 of the assistance device 100 of FIG. 1 acknowledges a switching instruction. The assistance device 100 transmits a signal to request the candidate position 400 (hereinafter "candidate position request") to the automatic driving control device 300. The automatic driving control device 300 derives the candidate position 400 by executing the same process as the processing interface 120 described above. The automatic driving control device 300 transmits the candidate position 400 to the assistance device 100. When the assistance device 100 receives the candidate position 400, the notification interface 130 generates a map image on which the candidate position 400 is superimposed. The notification interface 130 displays the map image on the display device 40.

Figure 19:
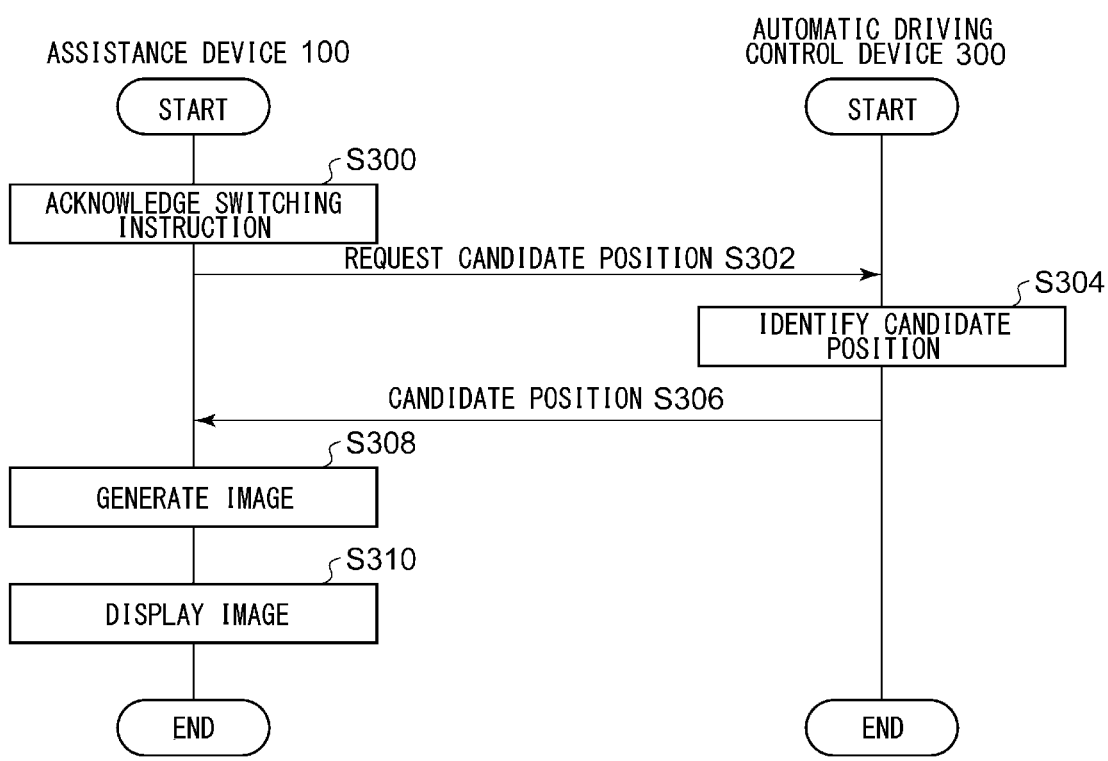
FIG. 19 is a sequence chart showing a sequence of steps performed by the vehicle of embodiment 6.

A description will now be given of the operation of the assistance device 100 having the above-described configuration. FIG. 19 is a sequence chart showing a sequence of steps performed by the vehicle 1000. The assistance device 100 acknowledges a switching instruction (S300). The assistance device 100 transmits a request for candidate position to the automatic driving control device 300 (S302). The automatic driving control device 300 identifies the candidate position 400 (S304). The automatic driving control device 300 transmits the candidate position 400 to the assistance device 100 (S306). The notification interface 130 of the assistance device 100 generates a map image on which the candidate position 400 is superimposed (S308) and displays the map image on the display device 40 (S310).

According to this embodiment, the assistance device 100 and the automatic driving control device 300 operate in coordination so that the flexibility of the configuration is improved.

A summary of an embodiment of the present disclosure is given below. An assistance device according to an embodiment of the present disclosure is an assistance device that supports, in a vehicle capable of executing an automatic driving mode and a manual driving mode as a driving mode, mode switching from the automatic driving mode to the manual driving mode, including: an acquisition interface that acquires data indicating a situation around the vehicle; and a notification interface that communicates a candidate position derived based on the data acquired by the acquisition interface, the candidate position being a candidate of a position where the mode switching should be executed. The notification interface communicates at least one of a distance to the candidate position, a period of time elapsed until the candidate position is reached, and a point of time when the candidate position is reached.

According to this embodiment, at least one of a distance to the candidate position, a period of time elapsed until the candidate position is reached, and a point of time when the candidate position is reached is communicated so that it is possible to let the driver know the position where the driving mode should be changed in a manner easy to understand.

Another embodiment of the present disclosure also relates to an assistance device. The device is an assistance device that supports, in a vehicle capable of executing an automatic driving mode and a manual driving mode as a driving mode, mode switching from the automatic driving mode to the manual driving mode, including: an acquisition interface that acquires data indicating a situation around the vehicle; and a notification interface that communicates a candidate position derived based on the data acquired by the acquisition interface, the candidate position being a candidate of a position where the mode switching should be executed. The notification interface displays a graphic indicating the candidate position on a road included in a map image.

According to this embodiment, a graphic indicating the candidate position is displayed on a road included in a map image so that it is possible to let the driver know the position where the driving mode should be changed in a manner easy to understand.

The notification interface may display the map image to show the candidate position at the center. In this case, the map image is displayed to show the candidate position at the center so that it is made easy to recognize the candidate position.

The notification interface may change a scale of the map image in accordance with a relationship between the candidate position and a position of the vehicle. In this case, the scale of the map image is changed in accordance with a relationship between the candidate position and a position of the vehicle so that is made easy to recognize the candidate position and the position of the vehicle.

The notification interface may display a lane suitable for the mode switching. In this case, a lane suitable for the mode switching is displayed so that it is made easy to recognize a lane suitable for the mode switching.

The notification interface may also communicate information related to a road expected to be passed beyond the candidate position. In this case, information related to a road expected to be passed beyond the candidate position is communicated so that it is possible to let the driver know the situation of the road since the switching to the manual driving mode.

The notification interface displays, as the information related to the road expected to be passed beyond the candidate position, wide area information showing a route in a wide area or right-turn/left-turn information at a junction point. In this case, wide area information showing a route in a wide area or right-turn/left-turn information at a junction point is displayed so that it is possible to let the driver know the situation of the road since the switching to the manual driving mode.

The notification interface may communicate, during the manual driving mode, information related to a road expected to be passed by the vehicle at a predetermined point of time, and the notification interface may communicate, during the automatic driving mode, information related to a road expected to be passed by the vehicle beyond the candidate position at a point of time earlier than the predetermined point of time. In this case, information related to a road expected to be passed beyond the candidate position is communicated at an earlier point of time so that it is possible to let the driver recognize the information early.

The notification interface may display an image indicating that the mode switching has been executed. In this case, an image indicating that the mode switching has been executed is displayed so that it is possible to let the driver recognize that the automatic driving mode has been switched to the manual driving mode.

The notification interface may display the map image to show a position of the vehicle at the center after the mode switching has been executed. In this case, the map image is displayed to show the position of the vehicle at the center when the mode switching is executed so that it is possible to let the driver recognize the current position easily.

Further, the assistance device may include a processing interface that derives a traveling route of the vehicle after the mode switching has been executed, wherein the notification interface may display the traveling route derived by the processing interface. In this case, the route of the vehicle traveled after the mode switching has been executed is displayed so that it is possible to let know the traveling route suitable for the situation after the mode switching has been executed.

Given above is a description of the present disclosure based on an exemplary embodiment. The embodiment is intended to be illustrative only and it will be understood by those skilled in the art that various modifications to constituting elements and processes could be developed and that such modifications are also within the scope of the present disclosure.

An arbitrary combination of embodiments 1 through 6 is also useful. According to this variation, the advantage from the arbitrary combination can be obtained.

While various embodiments have been described herein above, it is to be appreciated that various changes in form and detail may be made without departing from the spirit and scope of the invention(s) presently or hereafter claimed.

What is claimed is:

1. An assistance device that supports, in a vehicle capable of executing an automatic driving mode and a manual driving mode as a driving mode, mode switching from the automatic driving mode to the manual driving mode, the assistance device comprising:

an acquisition interface that acquires data indicating a situation around the vehicle; and a notification interface that communicates a candidate position derived based on the data acquired by the acquisition interface, the candidate position being a candidate of a position where the mode switching from the automatic driving mode to the manual driving mode should be executed and being indicated by a latitude and a longitude, wherein the notification interface displays a graphic indicating the candidate position on a road included in a map image, the notification interface communicates, during the manual driving mode, information related to a first road expected to be passed by the vehicle at a predetermined point of time, and the notification interface communicates, during the automatic driving mode, information related to a second road expected to be passed by the vehicle beyond the candidate position at a point of time earlier than the predetermined point of time.

2. The assistance device according to claim 1, wherein the notification interface displays the map image to show the candidate position at a center of the map image.

3. The assistance device according to claim 1, wherein the notification interface changes a scale of the map image in accordance with a relationship between the candidate position and a position of the vehicle.

4. The assistance device according to claim 1, wherein the notification interface displays a lane suitable for the mode switching.

5. The assistance device according to claim 2, wherein the notification interface displays, as the information related to the second road expected to be passed beyond the candidate position, wide area information showing a route in a wide area or right-turn/left-turn information at a junction point.

6. The assistance device according to claim 1, wherein the notification interface displays an image indicating that the mode switching has been executed.

7. The assistance device according to claim 1, wherein the notification interface displays the map image to show a position of the vehicle at a center of the map image after the mode switching has been executed.

8. The assistance device according to claim 1, further comprising:
a processing interface that derives a traveling route of the vehicle after the mode switching has been executed, wherein
the notification interface displays the traveling route derived by the processing interface.

9. The assistance device according to claim 1, wherein the candidate position is a position with a largest radius of curvature on a route that the vehicle is traveling.

10. The assistance device according to claim 1, wherein the candidate position is a position closest to a straight line on a route that the vehicle is traveling.

11. The assistance device according to claim 1, wherein the candidate position is discarded when a location of an obstacle, a section of a traffic jam, or a spot of occurrence of a traffic accident is within a certain distance from the candidate position.

12. The assistance device according to claim 1, wherein a plurality of positions on a route that the vehicle is traveling is derived as the candidate position in a descending order of radius of curvature.

* * * * *